United States Patent [19]

Hochstrate

[11] 4,253,097
[45] Feb. 24, 1981

[54] METHOD AND APPARATUS FOR REDUCING POWER CONSUMPTION TO ACTIVATE ELECTROLUMINESCENT PANELS

[75] Inventor: Paul Hochstrate, Bristol, Conn.
[73] Assignee: Timex Corporation, Waterbury, Conn.
[21] Appl. No.: 24,933
[22] Filed: Mar. 29, 1979
[51] Int. Cl.³ ............................................. H05B 33/08
[52] U.S. Cl. ................ 340/781; 315/169.3; 315/283; 340/811
[58] Field of Search .............. 340/760, 781, 782, 811; 315/169.3, 283

[56] References Cited

U.S. PATENT DOCUMENTS

| | | | |
|---|---|---|---|
| 3,209,229 | 9/1965 | Cox | 340/781 X |
| 3,388,292 | 6/1968 | Burns | 340/782 |
| 3,749,977 | 7/1973 | Sliker | 340/781 X |
| 4,070,663 | 1/1978 | Kanatani et al. | 340/781 X |
| 4,114,070 | 9/1978 | Asars | 315/169.3 X |

FOREIGN PATENT DOCUMENTS

| | | |
|---|---|---|
| 1201092 | 8/1970 | United Kingdom. |
| 1324053 | 7/1973 | United Kingdom. |
| 1330172 | 9/1973 | United Kingdom. |

*Primary Examiner*—David L. Trafton

[57] ABSTRACT

An electroluminescent (EL) panel is provided wherein the phosphor bodies are excited to luminesce by a low duty cycle pulsed high frequency potential. Power consumption is reduced further by the use of an inductor coupled across a subdivided EL panel activated by a low frequency pulse.

8 Claims, 6 Drawing Figures

METHOD AND APPARATUS FOR REDUCING POWER CONSUMPTION TO ACTIVATE ELECTROLUMINESCENT PANELS

BACKGROUND OF THE INVENTION

This invention relates to an electroluminescent panel or lamp suitable as a light source for passive electrooptic displays. More particularly, this invention relates to electroluminescent light panels and methods for reducing power consumption of electroluminescent light panels.

DESCRIPTION OF THE PRIOR ART

Electric lamps utilizing phosphors have been previously known.

Typically, electroluminescent cells comprise a pair of spaced electrodes with one or more layers of field-responsive phosphor material sandwiched between the two electrodes. When an alternating potential is applied between the two electrodes, the resulting electric field excites the phosphor to luminesce.

However, the main drawback to the commercial use of EL devices as a light source, particularly for use as a backlight in small battery operated devices such as electrooptic display type wristwatches, are their relatively poor efficiency in converting electrical energy to light.

In one prior art device, the electroluminescent cell utilizes very finely-divided phosphors in an attempt to enhance efficiency.

The following patents represent some of the prior art pertinent to the field of electroluminescent panels: U.S. Pat. Nos. 2,980,816 issued Apr. 18, 1961 to Elmer Curry Payne; 3,673,572 issued June 27, 1972 to Philip O. Sliva; 4,099,091 issued July 4, 1978 to Hiroshi Yamayoe et al; 3,040,202 issued June 19, 1962 to Willi Lehmann; 3,496,410 issued Feb. 17, 1970 to Alfred J. MacIntyre; 3,914,932 issued Oct. 28, 1975 to Kalsuhiro Teraishi et al; 3,894,389 issued July 15, 1975 to Teiji Miura et al; 3,992,873 issued Nov. 23, 1976 to Rockland Karl Awalt; and 4,011,557 issued Mar. 8, 1977 to Fernand Chetelat et al.

These patents are mentioned as being representative of the prior art and other pertinent patents may exist.

SUMMARY OF THE INVENTION

Generally speaking, in accordance with the invention, a driving arrangement is provided for energizing an EL cell to luminesce by means of low duty cycle bursts of high frequency pulsed electrical signals.

In one embodiment of the invention the capacitive reactive component of the EL cell is substantially cancelled or tuned-out by means of an inductance coupled to the EL cell.

Accordingly, an object of this invention is to provide a new and improved method for energizing an EL cell.

Another object of this invention is to provide a new and improved electrically energized electroluminescent panel.

A further object of this invention is to provide a new and improved arrangement for driving an EL cell.

A further object of this invention is to provide a new and improved electroluminescent panel or lamp having improved efficiency to enable its use as an illumination source for battery powered electrooptic displays.

BRIEF DESCRIPTION OF THE DRAWINGS

Other objects and advantages of this invention may be more clearly seen when viewed in conjunction with the accompanying drawings. Similar reference numerals refer to similar parts throughout.

Referring now to FIG. 1 of the drawings, an EL cell is illustrated which generally comprises a transparent outer protective foundation or plastic layer 2 having coated thereon a light-transmitting first electrode 3. Over the first electrode 3 is coated a layer 4 of electroluminescent phosphor material. Over the phosphor layer 4 is a second electrode 5. And over the second electrode 5 is a second protective layer 6. An epoxy seal 7 is used to bind the EL cell together. Electrical lead conductors 8,9 are electrically connected to the electrodes 3 and 5, respectively, and are adapted to be connected across a source of AC electrical potential (not shown).

Figure 1:
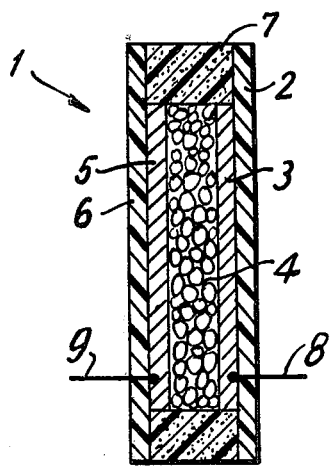
FIG. 1 is a cross-sectional side view of an electroluminescent panel.
Figure 2A:
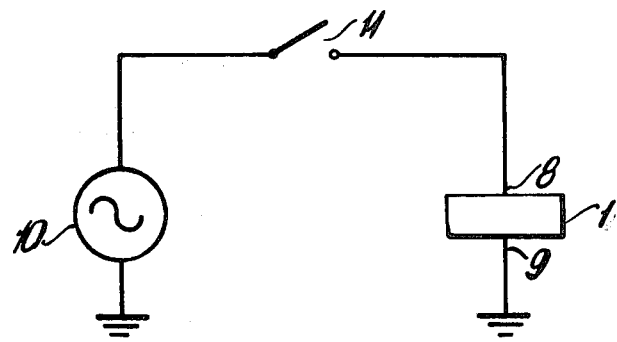
FIGS. 2a and 2b are a schematic view and resulting impulsing wave forms, respectively, of one embodiment of the invention.

In the embodiment shown in FIG. 2a, electrode 9 is connected to ground. Electrode 8 is connected to an AC source 10 via a series switch 11. Although switch 11 is shown as a mechanical device, the invention is not intended to be limited thereto. It will occur to those skilled in the art that electronic devices such as transistors or logic circuits could be substituted in lieu thereof.

In accordance with the invention, it has been determined that a reduction of power, i.e., improved efficiency, can be obtained by impulsing the EL cell with a high frequency-low duty cycle alternating AC voltage potential. A minimum power requirement is obtained when the cell or panel or segment of the panel is excited by a spurt of one cycle 17 of a high frequency alternating potential, for example, between 1 KHZ and 10 KHZ, at a repetition or refresh rate of slightly greater than the flicker rate of 32 HZ. This yields a duty cycle of 0.3 to 3 percent.

It has been experimentally determined that a spurt of at least one cycle 17 of a high frequency AC voltage potential periodically applied at a repetition rate above the flicker rate is adequate for activation of the phosphors in an EL cell to produce a glow that equals that of a continuous wave activated EL cell. Power requirements of approximately 3 percent of the continuous wave power requirements have been achieved in accordance with this invention.

Figure 2B:
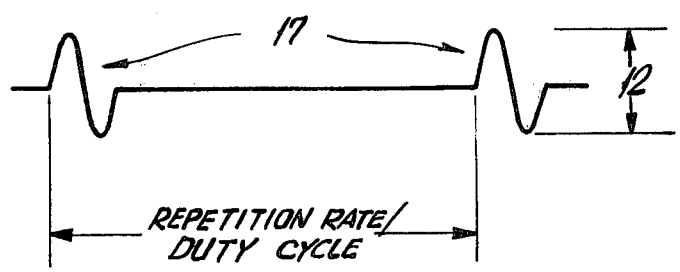

The waveform illustrated in FIG. 2b can be applied across the EL cell 1 by periodically closing the series switch 11. Of course, it is assumed that the peak-to-peak voltage 12 is sufficient, for example, 60 to 80 volts, for exciting the phosphor layer 4. The AC wave pulse(s) repetition rate can be calculated or empirically determined such that the EL cell or lamp would not be perceived as flickering due to retinal retention.

Figure 3:
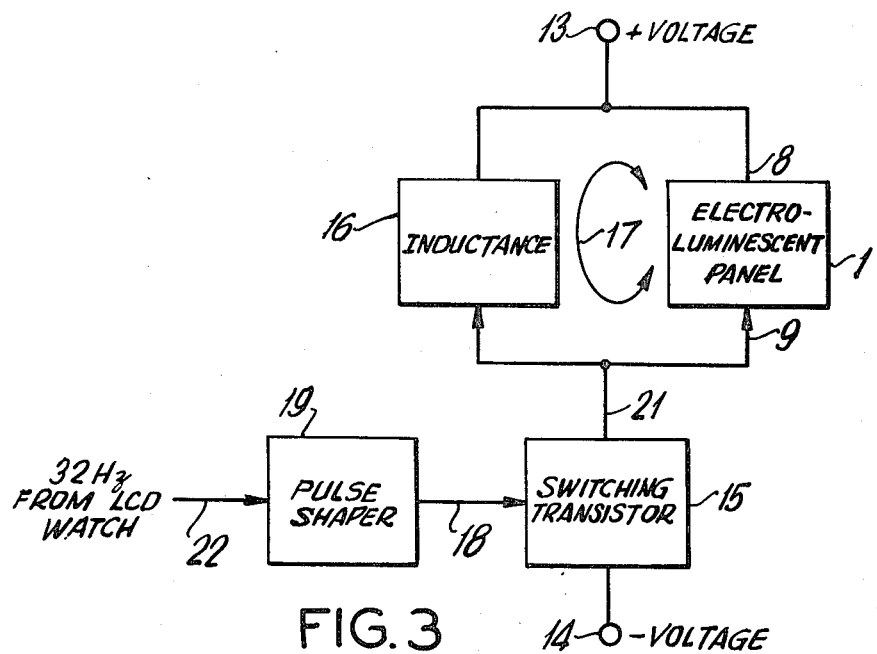
FIG. 3 is a block diagram of a second embodiment of the invention.
Figure 4:
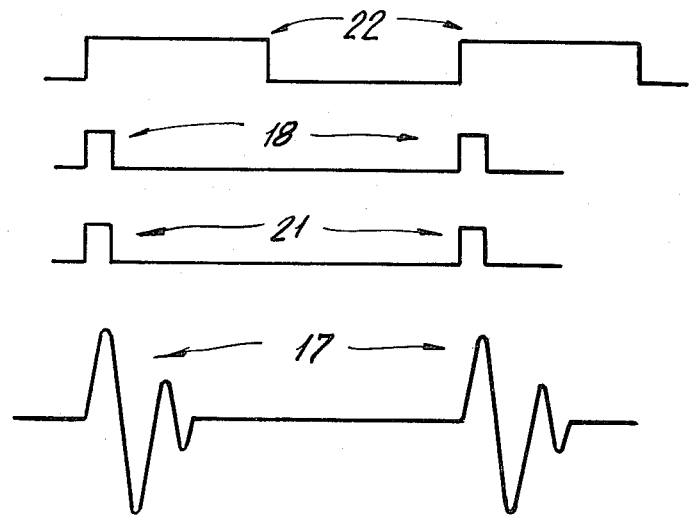
FIG. 4 is a sketch of electrical potential which result as the EL panel illustrated in FIG. 3 is periodically coupled to a power source.

Referring to FIGS. 3 and 4, a preferred embodiment of the present invention is illustrated which has particular application as a display illumination source in low voltage/power battery operated devices such as watches, calculators, meters and the like.

One electrode lead 8 of the EL panel 1 is coupled to a positive terminal 13 of a first battery of a split battery power source 13,14. The other terminal of the battery (not shown) is connected to ground. Electrode lead 9 is coupled via a switching transistor or circuit 15 to a negative terminal 14 of a second battery (not shown) of the split battery power source. The other (positive) terminal of battery (not shown) is connected to ground. An inductance 16 is coupled across the EL panel 1 to form an LC tank or ringing circuit comprising inductance 16 and the capacitance of the EL cell 1. The LC tank circuit is periodically impulsed, by closing the circuit between the split battery power source connected by terminals 13,14 with switching transistor 15, to induce at least one oscillatory signal 17 across the EL (capacitive) panel 1. The switching transistor 15 is responsive to a control signal/pulse 18, applied to its control gate (not shown), to close the normally non-conducting, i.e., open, switching transistor 15. This permits a voltage-current pulse 21 to flow through switching transistor 15 to supply generative or regenerative energy to the LC tank circuit. At resonance the power dissipated is resistive with the LC tank reactive components nulled out. A pulse shaper circuit 19 provides the control signal/pulses 18.

As a result of tuning out the capacitive shunt component of the panel by the addition of the inductance 16, a resonant circuit is obtained which now can be used to generate the high voltage pulse 17 required to activate the phosphors in the EL panel 1 from the low voltage split battery power source connected to terminals 13,14. This also reduces the power expended on creating the high voltage pulse by other circuitry. Therefore, in accordance with the invention, this embodiment provides a means for impulsing an EL panel 1 with a high voltage and high frequency AC signal obtained from a lower voltage single or split (dual) battery power source such as used in watches and the like.

While a wide variety of types of EL panels, inductors, transistors, frequencies, voltage-batteries and associated elements may be employed, the circuit and EL (lamp) panel illustrated in FIG. 3 was constructed and successfully operated using the following components:

| | |
|---|---|
| Voltage source 13 | } 2 OV |
| Voltage source 14 | |
| EL panel capacitance | 0.02 nf |
| Inductor 16 | 68 nh |
| LC tank circuit $f_{LC}$ | 342 KHZ |
| LC pulse voltage Peak-to-Peak | 9 OV |
| Pulse 17 duty cycle | 0.2% |

Figure 5:
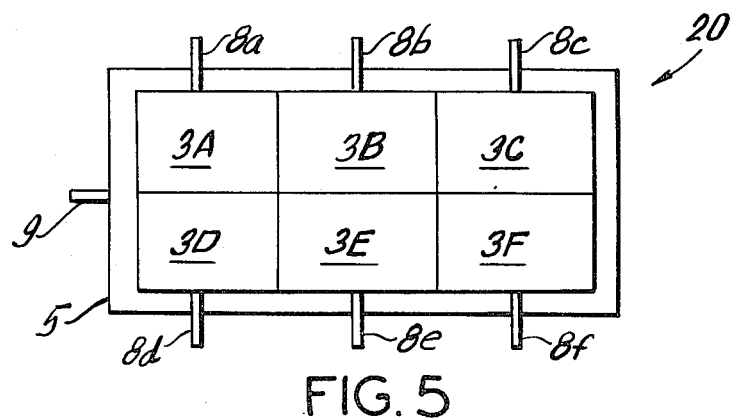
FIG. 5 is a plan view of a multiplexed EL panel impulse energized in accordance with the present invention.

Referring now to FIG. 5, a subdivided EL panel 2 is shown. Based on investigations of EL panels, it was determined that a direct relationship exists between the surface area of a parallel plate configured EL panel and the resultant current drain through the device. A basic watch display EL panel, for example, requires in the proximate range of 42 microamperes of current of 60 HZ to produce sufficient illumination to read a liquid crystal display in low or adverse light conditions. Using the technique of multiplexing the backlight panel as described more fully in copending U.S. patent application Ser. No. 24,934 filed concurrently with this application on Mar. 29, 1979, the total current requirement would be the sum of the current for all the discrete segments of the panel divided by the number of discrete segments. If the number of multiplexed segments is chosen as six (3A-3F) then the current being drawn is reduced, for example, to seven microamperes. Also the peak or surge current is reduced which improves the life of the EL panel 20.

In the embodiment illustrated in FIG. 5, each segment 3A-3F is sequentially energized to luminesce by a low duty cycle high frequency pulse as described above. In this manner, the inherent cross talk which EL panels tend to exhibit is beneficially utilized to obtain an illumination (lamp) panel having substantially uniform and continuous light output, when actuated, with improved efficiency.

What is claimed is:
1. A lamp device comprising:
an electroluminescent panel having a pair of electrodes with electroluminescent material interposed therebetween, at least one of said electrodes being light transparent;
inductance means connected in parallel circuit relationship across the electroluminescent panel to form a parallel resonant tank circuit therewith; and
means for providing repetitive current impulses to the tank circuit for exciting the tank circuit into oscillation substantially at the natural resonant frequency thereof and producing high frequency voltage impulses repetitively for exciting the electroluminescent panel to emit substantially continuous, non-flickering perceivable light.
2. A lamp device as set forth in claim 1, wherein;
the capacitive reactance of the electroluminescent panel and the inductive reactance of the inductance means form a tank circuit having a predetermined resonant frequency that is substantially higher than the repetition rate of the current impulses.
3. A lamp device as set forth in claim 1, wherein:
the repetitive current pulses have a predetermined repetition rate that is greater than the decay rate of the electroluminescent material.
4. A lamp device as set forth in any of claim 1, claim 2 or claim 3 wherein:
the tank circuit has a resonant frequency equal to or greater than one kilohertz; and
the repetition rate of the current pulses is equal to or greater than thirty-two current pulses per second for continuous perceivable non-flickering light output from the electroluminescent panel.
5. A lamp device as set forth in claim 1, wherein:
the repetitive current pulses are provided from a battery power source via a repetitively operated switching device; and
the tank circuit oscillation provides at least one cycle of high voltage alternating electric field potential having a voltage greater than said battery power source for application across the electrodes of the electroluminescent panel.
6. A lamp device as set forth in claim 5, wherein:
the battery power source has a voltage between one and five volts; and
the alternating electric field potential produced by the tank circuit has a voltage between twenty and one hundred volts and a frequency between five hundred hertz and twenty kilohertz.
7. A lamp device as set forth in claim 1, wherein:

the tank circuit oscillation has a duty cycle of less than twenty-five percent.

8. An electroluminescent panel comprising:

a pair of electrodes, at least one of which being light transparent;

electroluminescent phosphor material disposed between said pair of electrodes;

an inductor means coupled across said electrodes to form therewith a parallel inductance-capacitance tank circuit;

a low voltage battery power source;

A switch in series between said tank circuit and said battery power source; and a control circuit for repetitively closing said switch to thereby intermittently couple said battery power source to said tank circuit at a repetition rate greater than the decay rate of said electroluminescent phosphor material for exciting the tank circuit to oscillate, whereby a high voltage alternating electric field is periodically applied across the electrodes having a predetermined tank circuit voltage and frequency to excite the electroluminescent phosphor material to emit sustained non-flickering light.

* * * * *